United States Patent [19]

Galand et al.

[11] Patent Number: 4,764,955

[45] Date of Patent: Aug. 16, 1988

[54] PROCESS FOR DETERMINING AN ECHO PATH FLAT DELAY AND ECHO CANCELER USING SAID PROCESS

[75] Inventors: Claude Galand, Cagnes sur Mer, France; Guy Platel, Durham, N.C.

[73] Assignee: International Business Machines Corp., Armonk, N.Y.

[21] Appl. No.: 919,724

[22] Filed: Oct. 16, 1986

[30] Foreign Application Priority Data

Oct. 30, 1985 [EP] European Pat. Off. ............ 85430038

[51] Int. Cl.⁴ ............................................. H04B 3/23
[52] U.S. Cl. ................................... 379/411; 370/32.1
[58] Field of Search ............... 379/406, 345, 407, 410, 379/411; 370/32, 32.1

[56] References Cited

U.S. PATENT DOCUMENTS

| | | | |
|---|---|---|---|
| 3,535,473 | 10/1970 | Flanagan et al. | 379/410 |
| 3,721,777 | 3/1973 | Thomas | 379/410 |
| 4,024,357 | 5/1977 | Sourgens et al. | 379/411 |
| 4,562,312 | 12/1985 | Duttweiler | 370/32 X |
| 4,582,963 | 4/1986 | Danstrom | 379/411 |
| 4,587,382 | 5/1986 | Yang | 379/410 X |
| 4,613,731 | 9/1986 | Godard | 379/410 |
| 4,645,884 | 2/1987 | Barazeche et al. | 379/406 |

FOREIGN PATENT DOCUMENTS 0137508 4/1985 European Pat. Off. ............ 379/410

Primary Examiner—Jin F. Ng
Assistant Examiner—Randall S. Vaas
Attorney, Agent, or Firm—John B. Frisone

[57] ABSTRACT

In a voice transmission network having an echo canceler including a flat delay line in series with an adaptive digital filter, a process is provided for adjusting the flat delay line length, thus enabling limiting the filter length to minimal value. The method is based on intercorrelation operations. It includes first intercorrelating sequences of energy values of blocks or consecutive samples, to derive a rough flat delay estimation therefrom; then intercorrelating sequences of signal samples with one of the sequences being roughly delayed, to derive therefrom an accurate flat delay estimation.

6 Claims, 3 Drawing Sheets

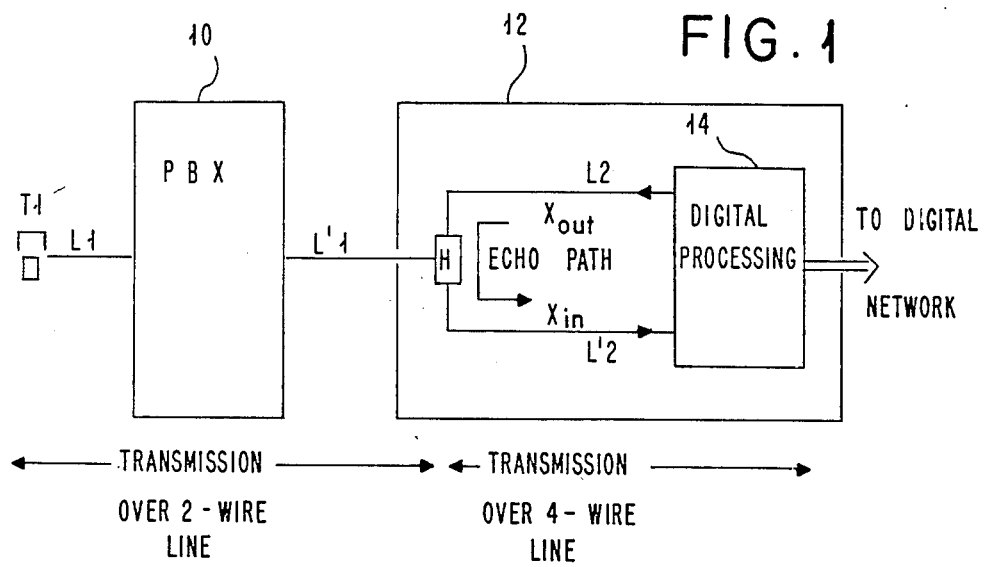
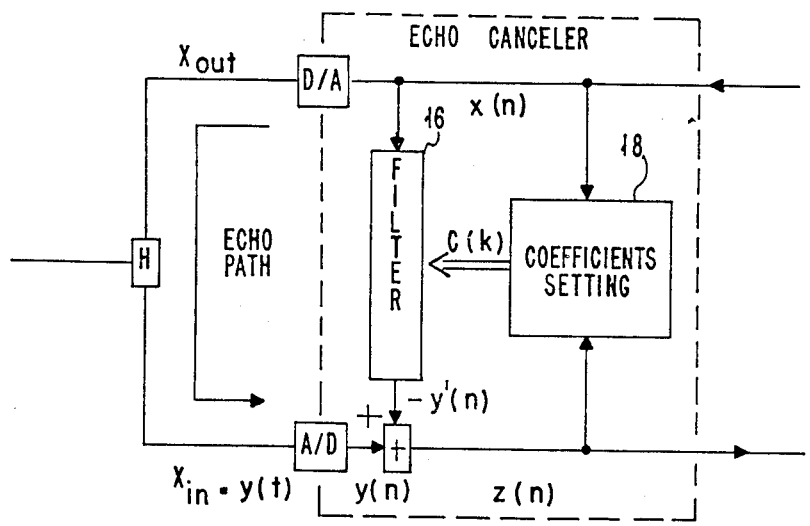

PROCESS FOR DETERMINING AN ECHO PATH FLAT DELAY AND ECHO CANCELER USING SAID PROCESS

This invention deals with digital transmission and more particularly with means for canceling echoes in a transmission network. It applies more particularly to voice transmission networks.

Two-way voice transmission over a telephone network is presently made partly over a two-wire bidirectional line and partly over a pair of unidirectionnal lines, sometimes referred to as a four-wire line. The connection between the two and four-wire lines, and vice-versa, is made through a hybrid transformer. Because these transformers cannot be loaded with an impedance which remains matched throughout the overall frequency bandwidth, a full separation between the unidirectionnal lines connected to a hybrid transformer cannot be achieved in practice. As a consequence, so called echoes are generated, meaning that a portion the voice signal over one of the unidirectional lines is fed back to the sender through the other unidirectionnal line.

For local calls the echoes are not particularly disturbing essentially because of the very short delay between the speech utterance from the speaker's mouth and it being returned back to his ear. Under these circumstances, the echo remains almost unnoticed. Such is not the case with long distance calls wherein fairly large delays may occur between the speech signal and the corresponding generated echo. These echoes should be removed.

Several solutions have already been proposed to solve the echo problem. They may be classified into two large categories, i.e. echo suppression or echo cancelation. The former category call for a drastic solution which implies switching one of the unidirectionnal lines, thus one of the speakers, off, based on relative energy levels over two unidirectionnal lines. In other words the loudest speaker wins. The latter solution is more efficient but involves a more elaborate, thus more expensive, process. Conventionally, with echo cancelling processes, an echo replica is generated and then subtracted from the echo spoiled signal. The echo replica generation needs performing the analysis of the signal flowing over the unidirectionnal lines to adjust the tap coefficients of a digital filter the impulse response to which should synthesize the echo path response.

In theory, the time slot during which the analysis should be performed should be commensurate with the distance between the hybrid and the echo cancellor. Thus, the filter delay line should also be made as long (delaywise) as the echo path, which means that a fairly large number of filter coefficients are to be adjusted dynamically. These coefficients are conventionally adjusted through a gradient method based on the intercorrelation of the echo suppressor output signal with the signal fed into the hybrid transformer.

Assuming the echo path be 32 ms long, with the voice signal being sampled at 8 Khz, then the echo filter order should be 256. The computing power for adjusting the filter would be fairly large, say, enabling four million multiplications to be performed per second.

It was already noted that, in order to save on the number of filter coefficients thus on the computing power required, one can approximate the echo path impulse response with a flat delay followed by a short impulse response (short filter). Consequently assuming said flat delay is correctly adjusted, then a valuable reduction of computing power required for echo cancelers in a voice transmission network may be achieved. Then the Finite Impulse Response (FIR) digital filter to be used may be made to include as few as 16 to 48 coefficients instead of 256.

Several methods have been proposed to estimate the flat delay length. For instance, the system could be first initialized with a training sequence before any speech traffic is established. Said training sequence is sent over the undirectionnal line toward the hybrid transformer at the beginning of any telephone communication, that is before effective voice traffic is established between a calling party and a called party. Then, analyzing the signal back from the hybrid transformer would help plotting the echo path impulse response and thus measuring the flat delay.

The above method, eventhough presenting a number of advantages, suffers, however, several drawbacks. Mainly, it requires monitoring and protocol, at the beginning of any communication. Also, although being rather short (say 200 ms) it may be unacceptable for some network configurations, connecting for example to common carriers. Such method is, in addition, micro code consuming. It may require 700 instructions, with all related memory spaces etc . . . . It also requires a high processing power involving up to 5 MIPS (million instructions per second) during a few milliseconds.

The method herein disclosed provides a considerable reduction while evaluating the echo path flat delay by intercorrelating energy data rather than voice signal samples. It also achieves the function through a two-steps approach, starting first with an energy correlation to get a rough flat delay estimate and then second adjusting the flat delay estimation using signal samples in a narrower window.

The above mentioned advantages of this method, together with few other advantages not cited, will appear from the detailed description of an embodiment of the invention made with reference to the drawings.

BRIEF DESCRIPTION OF THE FIGURES

FIG. 1 is a block diagram of a portion of a telephone network.

FIG. 2 is a diagram showing the echo canceler location within the network.

DESCRIPTION OF ONE EMBODIEMENT OF THE INVENTION

Figure 3:
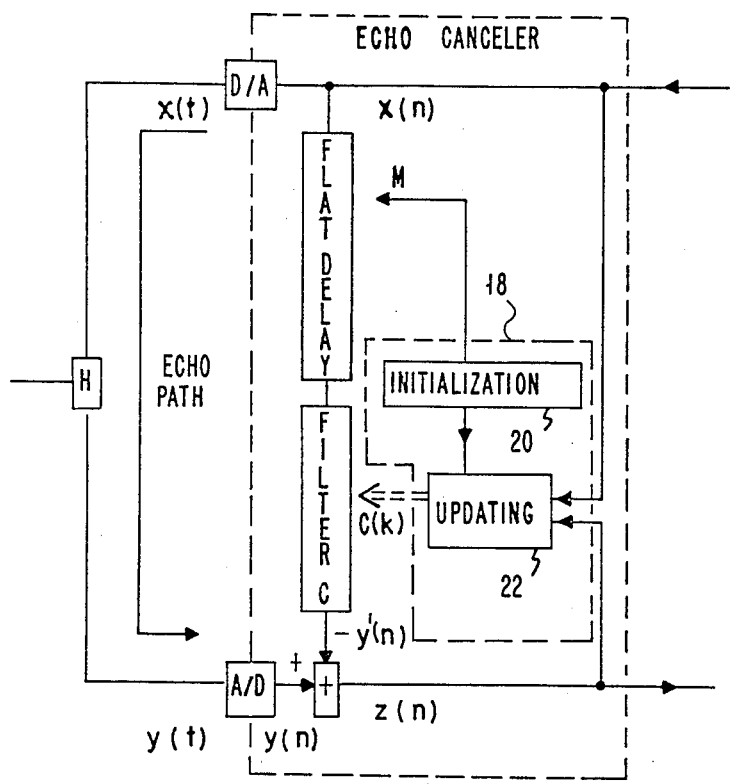
FIG. 3 is a representation of the echo canceler.

Represented in FIG. 1 is a block diagram showing few elements of a modern telephone network. The communication between the subscriber voice terminal T1 and a subscriber voice terminal T2 (not shown) goes first through a central switching system (PBX) 10 over a bi-directional line L1. The PBX10 is connected, say to an international transmission unit 12, again through a bi-directional (2 wires) line L'1. Within the Unit 12 the voice signal is made to flow over a pair of unidirectional lines L2 and L'2, each being a 2-wire line, both representing thus a 4-wire line, with the two to four-wire lines conversion being provided by a hybrid transformer H. The input signal Xin provided by T1 flows over L'2, while the output signal Xout to be fed to T1 flows over L2. Assuming the transmission over the considered network include a digital network section, then Analog-to-Digital (A/D) and Digital-to-Analog (D/A) conversions need be operated within a digital processing unit 14.

Assuming the hybrid transformer load matching be perfect over the voice frequency bandwidth, then the Xout signal provided by T2 (not shown) would entirely be fed through L'1, PBX10 and L1 toward T1. In practice the perfect matching never occurs, and therefore a portion of Xout is fed back as an echo to T2 through H and L'2. Thus, Xin is said to be echo spoiled.

Represented in FIG. 2 is a conventional arrangement made to cancel the echo. A digital filter 16 is connected to the outgoing path and fed with digital signal samples x(n). The filter coefficients C(k) are set by a coefficient setting device 18, so that the filter 16 should generate a signal y'(n) which ideally, assuming no signal is provided by T1, would be the exact replica of the digital representation of the signal y(t) fed into the analog to digital converter (A/D). Then, subtracting the filter output from the A/D output should cancel the echo z(n). In operation, the coefficient settings are conventionnally performed using a gradient method, and thus after several approximating steps. These settings need also be updated during the communication, and from time to time.

As already mentioned previously, the filter should match perfectly the echo path and needs in theory a large number of taps and coefficients. In practice, the filtering operations are made using a program controlled microprocessor operating multiplication operations over the x(n) samples, and addition operations of the results. The computing workload might be fairly high making the whole system useless in the field.

Figure 4:
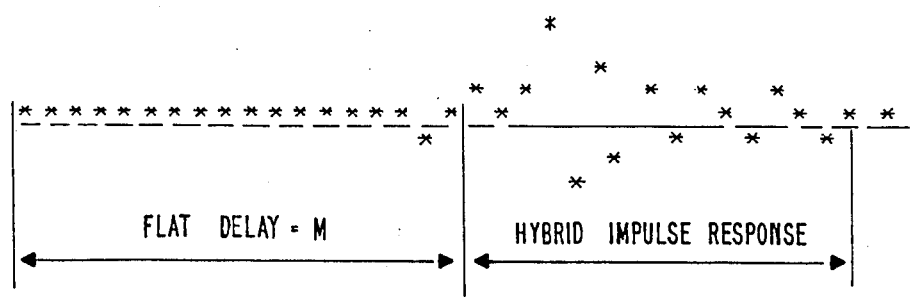
FIG. 4 illustrates the canceler filter impulse response.

A Perfect replica generating means should have an impulse response perfectly matching the echo path impulse response a digital representation of which is represented in FIG. 4. This figure shows a flat portion followed by the hybrid transformer impulse response. The echo replica means should provide the same overall response.

One solution for limiting the echo canceling processing load to a reasonable level, involves thus using a flat delay line (length M) ahead of the filter as shown in FIG. 3. In other words, a portion only of the delayed samples are effectively processed by the digital filter, and thus only a portion of the delay line of filter 16 (see FIG. 2) is used for the filter represented in FIG. 3. The coefficient setting device (18) is thus made to include not only means for initializing the coefficients setting and means for updating the coefficient values, but also means for adjusting the flat delay line length to its optimal value during the initialization step. And the main problem to be solved here lies with how to adjust the flat delay line length to optimize the filter synthesizing the hybrid impulse response.

Figure 5:
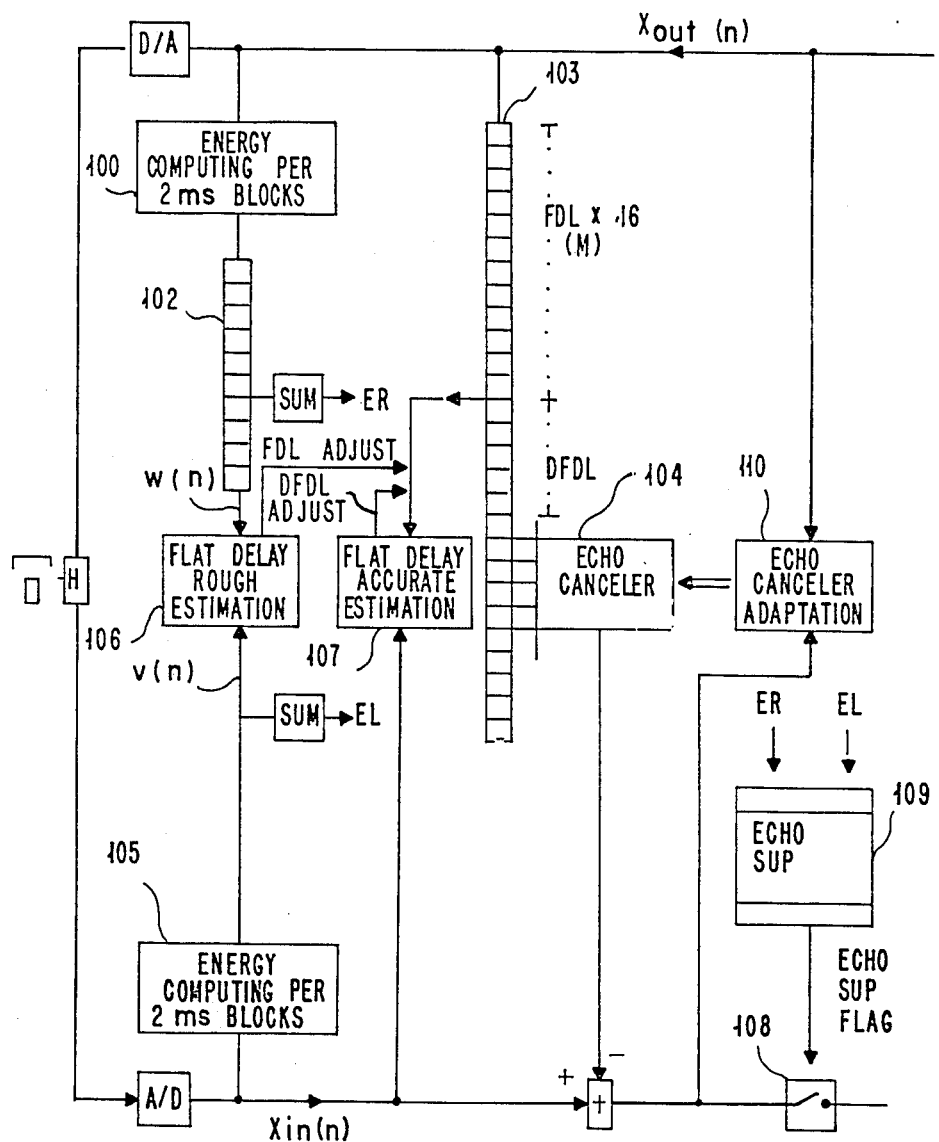
FIG. 5 is a detailed representation made to illustrate the invention.

The proposed method is illustrated in FIG. 5. It is based on intercorrelating short time (e.g. 2 ms) outgoing (Xout) and incoming (Xin) signal energy values to determine a rough flat delay value and then intercorrelating a limited number of Xout(n) and Xin(n) voice signal samples to more accurately determine the optimal flat delay length.

It should be recalled that the network wherein the system is being implemented is provided with digital encoding means applying PCM Block Companded (BCPCM) coding techniques. With BCPCM the voice signal is split into consecutive segments 20 ms long and each segment provides a block of, say, 256 samples, which are coded and transmitted together as a block, over the telephone network. Xout(n) and Xin(n) are thus made to include such 20 ms long blocks of samples.

The proposed method depicted in FIG. 5, features two inter-correlation building blocks 106 and 107 which are used for the flat delay determination. Ideally, the inter-correlation would be evaluated between the input and output speech sequences Xin(n) and Xout(n), but this computation would require too much processing load. So in order to keep the processing load sufficiently low to enable executing other tasks such as speech compression/decompression with the available computing power, a two-step determination of the hybrid flat delay is disclosed here.

The energy of the speech signal Xout is first computed by blocks of 2 ms in device 100. The resulting $N_1$ sample sequence, or output energy block w(n), ($N_1=10$ values per 20 ms block) is fed into a delay line 102 incorporating $N_2$ taps. $N_2$ is chosen so as to check:

$$N_2 \times 2 \text{ ms} \geq T_{max}$$

where $T_{max}$ represents the maximum expected hybrid impulse response duration. In practice $T_{max} < 32$ ms, so that $N_2 = 16$.

The signal Xout(n) is also fed into a delay line 103 which comprises $T_{max}/8$ KHz (in practice 256) taps, and which will furthermore be used by the echo canceler filter 104.

The incoming signal Xin(n) is processed in the same way as the outgoing signal Xout(n). That is, its energy is computed by blocks of 2 ms in device 105 giving a $N_1 = 10$ value sequence v(n) per 20 ms block, v(n) thus representing an input energy block.

For each 20 ms block, these 10 values are forwarded to a device 106 where the inter-correlation R(k) between the sequences $$v(n) \ (n=1,\ldots,N_1=10)$$

and $$w'(n) \ (n=1,\ldots,(N_2+N_1)=26)$$

Where the last $N_1$ samples of the w'(n) sequence represent the $N_1$ samples of the w(n) sequence corresponding to the current block while the $N_2$ first samples of the w'(n) sequence represent the previous samples delayed by the delay-line 102 is evaluated by:

$$R(k) = \sum_{n=1}^{N_1} v(n) \cdot w'(N_2 + n - k) \qquad (1)$$

$$k = 0, \ldots, N_2$$

By searching the maxima of the R(k) function, one can determine roughly the flat delay FDL in the echo path. The location of the maximum R(k) indicates the rough flat delay value. The echo canceler filter delay line 103 is thus adjusted to provide a rough flat delay portion (FDL × 16), otherwise referred to as FDL.

The inter-correlation has been computed on energy sequences, where each energy value represents 2 ms of speech (16 speech samples). As mentioned, the goal of this strategy is to decrease the processing load which is reduced to the computation of relation (1) for each 20 ms block. The processing load corresponds to the evaluation of $N_2 \times N_1$ products$=16 \times 10=160$ products per input block, or equivalently 1 product per input 8 KHz sample.

However, although the processing load is very low, it is clear that once the echo flat delay FDL has been estimated, there always remains a 16 sample uncertainty. This uncertainty can however be solved in a second step where the inter-correlation of the speech samples themselves is computed in a device 107.

This device takes on one hand the incoming samples Xin(n) and on the other hand the outgoing samples Xout(n-FDL) delayed by the roughly estimated delay FDL, and computes another inter-correlation function:

$$R'(k) = \sum_{n=1}^{N_3} Xin(n) \cdot Xout(n - FDL - k) \quad (2)$$

$$k = -N_2, \ldots, N_2$$

where $N_3$ can be chosen in the range $$N_2 < N_3 < N_1 \times N_2$$

Note here that negative values for the index of Xout should refer to previous samples stored in delay line 103.

Inspection of R'(k) for maximum searching gives an increment or Delta delay (DFDL). This value is used to more accurately adjust the flat delay line 103 with a DFDL variation.

In practice, the invention process may further by improved by not using just one single R(k) function directly, but rather considering an histogram of the correlation function peaks. For that purpose, several inter-correlations are cumulated over a given number of successive blocks. Then the FDL value is adjusted to the histogram peak.

Also, the process could be again improved by computing R(k) on the sign of the derivatives of the v(n) and w(n) sequences. This enables automatically avoiding any scaling problem which may occur in case of high hybrid gain.

Once both FDL and DFDL have been determined the echo canceler filter 104 is actuated with the delay line 103 adjusted to provide a (16 FDL+DFDL) long flat delay ahead of the echo canceler filter 104. Said filter taps are adjusted using echo canceler adaptation means (110) and conventional gradient method.

In practice, the flat delay determination requires being computed over a few blocks, say, three to four blocks, i.e. 60 to 80 ms. Therefore, the process could be either processed during the first received talkspurt, or during the transmission of progress and dial-tones. In this case, it is expected that the short-term stability of these signals would improve the R(k) analysis.

During this so-called learning phase, wherein FDL and DFDL are being computed and the flat delay line adjusted, the system may be operated in the echo suppress mode. For that purpose, the 2 ms block energies v(n) and w(n) are accumulated over 20 ms in devices SUM to provide energy indications respectively designated EL and ER. These two values are used to control an echo suppress switch 108, in a conventional way, by comparing the ratio EL/ER to a given threshold. Should EL/ER be greater than "one", then the echo suppress flag generator 109 generates a zero flag leaving the switch 108 closed. Otherwise, the EL/ER ratio is compared with a predetermined threshold α to decide whether the echo suppress flag should be set to one. In the latter case, an ambiguous situation may occur when EL/ER is close to α. In this case, several consecutive measurements of EL/ER are performed to help confirming the setting choice.

We claim:

1. In a communication system having first and second one way transmission paths connected to a two way communication path by a hybrid transformer, a method for cancelling echo signals of signals on said first one way transmission path which are transmitted through the said hybrid transformer to said second one way transmission path comprising the steps of:

measuring in sequence the signal energy present in the said first path over sequential finite time periods;

measuring in sequence the signal energy present in the said second path over sequential finite time periods;

correlating the energy measurements made in the said second path with energy measurements made in the said first path and determining a rough flat delay value;

delaying a replica of the signal in the said first path as a function of the rough flat delay value;

correlating samples of the delayed replica during a predetermined period thereof with samples of the signal on the said second path to determine a delta delay value and further delaying the delayed replica of the signal on the first path as a function of the delta delay value; and applying the said further delayed replica of the signal in the said first path to an echo canceller connected in the said second path.

2. A method as set forth in claim 1 in which the step of correlating energy measurements is repeated a predetermined number of times and the rough flat delay value determination is accomplished using a histogram.

3. A method as set forth in claim 1 or 2 in which the sequential energy measurements in the first path encompass a time period substantially equal to the maximum signal transmission time between two points in the system where the energy measurements in the first and second paths take place.

4. A method as set forth in claim 3 in which signals transmitted over the first and second paths are transmitted by fixed length blocks.

5. A method as set forth in claim 4 in which signals on said first and second paths are voice signals.

6. An echo canceller, for use in a voice transmission network having a two-way communication path, first and second one-way communication paths for transporting voice signals, respectively, to and from said two-way path, and a hybrid transformer for connecting said first and second paths to said two-way path, comprising:

first means connected to the said first path for measuring and storing the energy in signals present on the first path in sequential predetermined equal time periods;

second means connected to the said second path for measuring and storing the energy in signals present on the second path in sequential predetermined equal time periods and for providing an energy sequence $V_{(n)}$ therefrom;

third means for receiving energy measurements from the first means and providing a delayed energy sequence $W_{(n)}$ therefrom;

fourth means connected to said first and second means for receiving said energy sequences $W_{(n)}$ and $V_{(n)}$, respectively, and correlating said energy sequences $W_{(n)}$ and $V_{(n)}$ to derive a rough estimate of the signal propagation delay through the hybrid transformer between the connection points of the said first and second means;

an adjustable flat delay means connected to said first path;

fifth means connected to said fourth means and said adjustable flat delay means for adjusting the delay of the delay means as a function of the rough estimate derived by the said fourth means;

an echo canceller means connected to the adjustable delay for receiving the delayed signal and to the said second path for subtracting estimated echo signals from signals in the said second path which contain the echo signals; and sixth means connected to said adjustable delay line and to the said second path for correlating delayed signals from the adjustable delay and signals received from the second path to generate an estimate of the delay between the correlated signals and providing a control signal representative thereof to said fifth means whereby said fifth means effects a fine adjustment of the flat delay.

* * * * *